June 29, 1948.  S. W. HENNESSEY, JR  2,444,099
HOLE-CUTTING SAW
Filed June 26, 1945
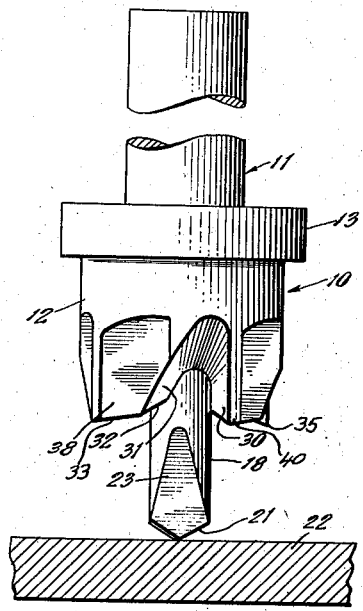
Fig. 1
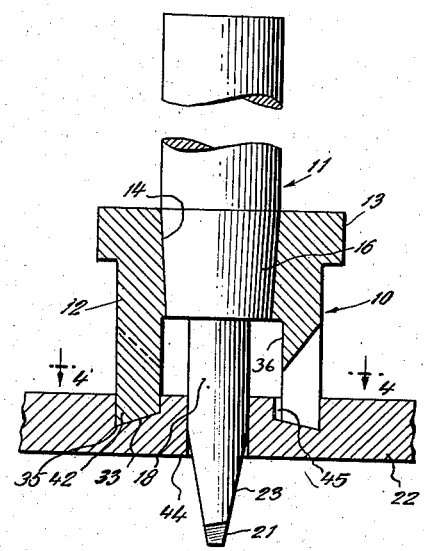
Fig. 2
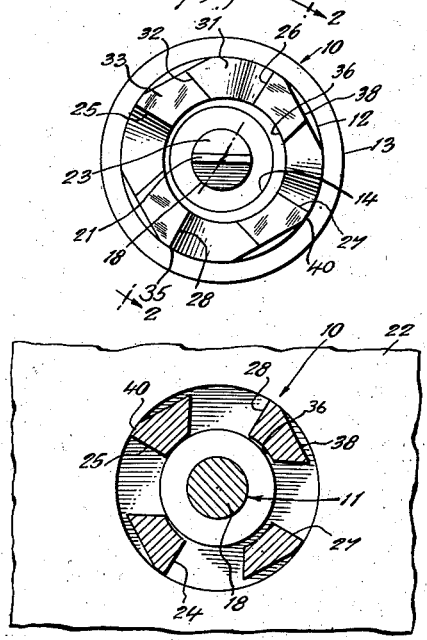
Fig. 3
Fig. 4
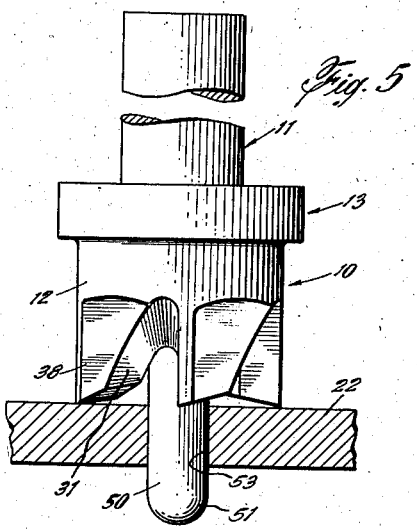
Fig. 5
INVENTOR.
Silas W. Hennessey, Jr.
BY John P. Chandler
his Attorney Patented June 29, 1948

2,444,099

UNITED STATES PATENT OFFICE 2,444,099

HOLE-CUTTING SAW

Silas W. Hennessey, Jr., Amityville, N. Y., assignor to Camloc Fastener Corporation, New York, N. Y., a corporation of New York Application June 26, 1945, Serial No. 601,703

3 Claims. (Cl. 77—69)

This invention relates to new and useful improvements in hole-cutting saws, and has for its principal object the provision of a novel device for cutting circular holes in metal, plastics or other materials which is speedy and accurate, and which does not bind. The present application constitutes a continuation-in-part of my co-pending application Serial No. 547,254, filed July 29, 1944.

In precision drilling of holes, a hole-cutting saw, as distinguished from a twist drill, is considered preferable, especially in cases wherein close tolerances are to be held. Twist drills seldom maintain their accuracy after a moderate amount of use, and when they become slightly bent they develop a whipping action and tend to cut a larger hole than was originally intended. Another objection to a twist drill resides in the fact that when it breaks through the material, it has a tendency to follow the groove in the drill, thus enlarging the hole and forming undesirable burrs.

Hole-cutting saws of the art are also objectionable in that the lozenge or slug cut as a result of the operation binds on the inner wall of the saw and requires a separate and troublesome operation to clear the saw for the subsequent cutting operations. Also, these saws commonly have up to twenty or even more teeth which are difficult to sharpen without affecting the diameter of the holes which are thereafter drilled. This close spacing of the teeth also causes the formation of small chips which tend to stick and bind, and also cause the formation of burrs.

The hole-cutting saw of the present invention eliminates all of the foregoing objections to hole saws and drills commonly in use, can be used for a relatively long period without re-sharpening, and can be easily re-sharpened without altering the diameter of the holes subsequently to be cut. Moreover, the hole is absolutely concentric with the center.

Thus, an important object of the present invention is the provision of a saw for cutting circular holes in sheet material which comprises a rotatable cutter having a plurality of axially-disposed, spaced teeth, the outer edges of the teeth lying in a circle which is concentrically disposed relative to the axis of the cutter, the inner edges of the teeth lying in a circle which is eccentrically disposed relative to the axis of the cutter, whereby the slug cut from the material has a diameter less than that of the latter circle.

The hole saw of the present invention is preferably mounted on a spindle which is received within the chuck of a drill press or jig borer. In one form of the invention, the lower end of the spindle forms a pilot which is received within a centered opening which has been previously drilled or punched into the material. In another form of the invention, the lower end of the spindle may have a drill point which drills the pilot hole, the drill portion extending below the cutting teeth of the hole saw. Above the drill portion, the spindle may be of uniform diameter which closely fits the pilot hole and accurately centers the saw for the larger hole-cutting operation.

The annular core which is cut from the sheet during the hole-cutting operation is of a width equal to the width of the widest tooth, the remaining teeth being of progressively narrowing width due to the eccentricity of the circle, relative to the axis, within which the inner edges of the teeth lie. If the difference between the width of the widest tooth and the narrowest tooth is about .008 inch, any tendency of the slug to bind is completely eliminated, and the work imposed on the widest tooth is ever so slightly more than that imposed on the narrowest tooth. Another important improvement in the present invention resides in the fact that the cutting edge of each tooth, which is substantially radially disposed relative to the axis, does not lie in a plane of rotation of the cutter, but rather is inclined downwardly and outwardly, the outer edge thus contacting the work first and completing the cutting of the hole in advance of the inner edge of such tooth. This arrangement imposes less strain upon the tooth than would be the case if the full length of the cutting edge engaged the work at the start of the cutting operation, and the teeth also remain sharp for a longer period of use.

In the drawing:

Fig. 1 is a front elevation of a hole-cutting saw embodying the present invention.

Fig. 2 is a vertical section through the hole-cutting saw, the section being taken on line 2—2 of Fig. 3.

Fig. 3 is a bottom plan view of the hole-cutting saw.

Fig. 4 is a horizontal section taken on line 4—4 of Fig. 2.

Fig. 5 is a front elevation of a modified form of the hole-cutting saw.

The hole-cutting saw of the present invention comprises a cutting element 10 carried by a shank 11. In some instances, the cutting element may be formed integrally with the shank, although the two-piece construction is preferable. The cutting element is formed with a generally cylindrical body portion 12 which may be enlarged at its upper end 13 to impart greater strength thereto. It is further formed with a centrally disposed, tapered bore 14 which receives tapered portion 16 of the shank. By forming these cooperating, substantially cylindrical surfaces with a taper of the order of .002 to the inch, the cutting element may be securely force-fitted on the shank and may thereafter be removed, when desired, with facility.

Below the tapered portion, the shank portion 18 is of reduced diameter, and at its lower end, portion 18 is formed with drill edges 21. Any desired form of drill element may be provided, although the form shown is preferred since the portion above the drill is of uniform diameter and snugly fits the hole made by the drill, thus providing a pilot for the cutting saw. This pilot not only holds the center for the cutting saw, but also supports the work 22 relative to the core which is cut by the saw. The distance which the opposed surfaces 23 extend upwardly relative to the teeth of the cutting element is a matter of choice, although the relationship should be such as to enable such surfaces to pass substantially completely through the work before the teeth of the cutting saw begin their cutting operation.

The number of cutting teeth is largely a matter of choice, four being illustrated in the drawing, thus forming four cutting edges 25, 26, 27 and 28. The provision of four cutting teeth gives the drill good balance and provides sufficient clearance between the teeth to facilitate sharpening. In a relatively larger drill, more teeth could be provided, or in some cases less than four may be formed. To form the four teeth, four longitudinal slots are cut in the body 12, each slot having a wall 30 which, when viewed as in Fig. 1, is substantially vertical and terminates at its lower end in one of the cutting edges. The other wall 31 is diagonally inclined, and terminates at its lower end at the rear edge 32 of surface 33, the forward edge of which forms the cutting edge of the next adjacent tooth.

The external surface of the body portion 12 is concentric with the axis of the rotating cutter, and accordingly the outer edges 35 of the several cutting teeth lie in a circle which is concentric with such axis. A bore 36, which is formed in the body portion prior to the cutting of the teeth, is preferably circular in cross-sectional contour, and is eccentrically disposed relative to such axis of rotation. Accordingly, it will be appreciated that the inner edges of the cutting teeth lie in a circle which is eccentrically disposed relative to the axis of the rotating cutter. In Figs. 3 and 4, the degree of such eccentricity is somewhat exaggerated, merely for purpose of illustration. In practice it has been found that by generating the inner wall about an axis displaced substantially .008 inch with respect to the outer wall axis, excellent results are obtained.

For the purpose of obtaining additional clearance for the drill and thus completely avoiding binding, the outer surfaces of the several cutting teeth are cut away, as shown at 38, such cut-away portion 38 in each tooth terminating short of each vertical wall 30. Thus, the outer wall of each tooth includes a relatively narrow portion 40 which lies in a circle concentric with the axis of the rotating cutter.

By referring now to Fig. 3, it will be noted that cutting edge 25 cuts the widest annular channel during the cutting operation, and that the next trailing cutting edge 26 cuts a channel of slightly lesser width. Also, the next cutting edge 27 cuts a channel of the narrowest width, and the final cutting edge 28 cuts a channel slightly wider than does edge 27. As was earlier pointed out, however, the differences between the widths of the annular channels cut by the respective teeth are sufficiently small so that substantially no greater strain is imposed upon cutting edge 25 than upon the other cutting edges.

It will be noted particularly from an examination of Fig. 2 that surface 33 at the lower end of each cutting tooth is not parallel with a plane of rotation of the cutting element, but is rather upwardly inclined at its inner edge. Thus, as the cutting teeth proceed through the work, a cut 42 of the cross-sectional area shown in Fig. 2 is progressively cut by the metal, the outer edges 35 of the cutting teeth cutting in advance of the inner edges. Thus, such outer edges have completed the cut before the inner edges have completely pierced the metal, and thus the slug, which is designated by the reference numeral 44, readily falls out. It will also be seen that there is a space 45 between the narrowest tooth and the inner surface of the annular channel cut by the cutting teeth.

In the embodiment of the invention illustrated in Fig. 5, the cutting element 10 is similar to the cutting element illustrated in Figs. 1 to 4, inclusive, in all respects. In this instance, however, shank 11, instead of being formed with a drill portion at its lower end, is simply formed with a pilot portion 50 of uniform diameter having a ball terminal 51. When this form of tool is employed, the work 22 is pre-drilled, as shown at 53, to form the pilot hole.

While two forms of embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A saw for cutting circular holes in sheet material comprising a cutter element and a shank, the cutter element comprising an annular body portion having a central bore, the shank being provided with an intermediate portion which is received within the bore and secured therein, the annular body portion of the cutter element being provided with a plurality of spaced, integrally-formed teeth, the outer surfaces of such teeth lying in a circle which is concentrically disposed relative to the axis of the shank, the inner surfaces of such teeth lying in a circle which is eccentrically disposed relative to the axis of the shank, a portion of such outer surfaces of the teeth being cut away to reduce friction during the cutting operation.

2. A saw for cutting circular holes in sheet material comprising a cutter element and a shank, the cutter element comprising an annular body portion having a central, tapered bore, the shank being provided with an intermediate tapered portion which is received within the tapered bore in forced-fit relation, the annular body portion of the cutter element being provided with a plurality of spaced, integrally-formed teeth, the outer surfaces of such teeth lying in a circle which is concentrically disposed relative to the axis of the shank, the inner surfaces of such teeth lying in a circle which is eccentrically disposed relative to the axis of the shank.

3. A saw for cutting circular holes in sheet material comprising a cutter element and a shank, the cutter element comprising an annular body portion having a central, tapered bore, the shank being provided with an intermediate tapered portion which is received within the tapered bore in forced-fit relation, the annular body portion of the cutter element being provided with a plurality of spaced, integrally-formed teeth, the outer and inner surfaces of such teeth lying in circles which are, respectively, concentrically and eccentrically disposed relative to the axis of the shank, the cutting edges of the teeth being substantially straight and being downwardly and outwardly inclined, the shank projecting below the plane of the cutting teeth and forming a pilot to guide the cutter element during the cutting operation.

SILAS W. HENNESSEY, Jr.

REFERENCES CITED

The following references are of record in the file of this patent:

UNITED STATES PATENTS

| Number | Name | Date |
|---|---|---|
| 687,724 | Cadell | Dec. 3, 1901 |
| 1,494,897 | Freye | May 20, 1924 |

FOREIGN PATENTS

| Number | Country | Date |
|---|---|---|
| 1,585 | Great Britain | 1908 |

OTHER REFERENCES

American Machinist, March 31, 1921, 77–69, pages 549, 550, "Trepanning Tools."